(12) United States Patent
Mrozinski et al.

(10) Patent No.: US 10,240,013 B2
(45) Date of Patent: Mar. 26, 2019

(54) MICROPOROUS MATERIAL FROM ETHYLENE-CHLOROTRIFLUOROETHYLENE COPOLYMER AND METHOD FOR MAKING SAME

(75) Inventors: James S. Mrozinski, Oakdale, MN (US); Randall P. Swenson, River Falls, WI (US); Karl-Dieter Weilandt, Woodbury, MN (US); Jonathan F. Hester, Hudson, WI (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 481 days.

(21) Appl. No.: 13/133,427

(22) PCT Filed: Dec. 14, 2009

(86) PCT No.: PCT/US2009/067807
§ 371 (c)(1),
(2), (4) Date: Jun. 8, 2011

(87) PCT Pub. No.: WO2010/071764
PCT Pub. Date: Jun. 24, 2010

(65) Prior Publication Data
US 2011/0244013 A1 Oct. 6, 2011

Related U.S. Application Data

(60) Provisional application No. 61/139,054, filed on Dec. 19, 2008.

(51) Int. Cl.
| | |
|---|---|
| *A01N 25/08* | (2006.01) |
| *C08J 5/18* | (2006.01) |
| *B01D 67/00* | (2006.01) |
| *B01D 69/02* | (2006.01) |
| *B01D 71/76* | (2006.01) |
| *B29C 67/20* | (2006.01) |
| *B32B 5/18* | (2006.01) |
| *B32B 5/02* | (2006.01) |
| *B32B 15/08* | (2006.01) |
| *B32B 27/06* | (2006.01) |
| *B32B 27/08* | (2006.01) |
| *B32B 27/12* | (2006.01) |
| *B32B 27/20* | (2006.01) |
| *B32B 27/32* | (2006.01) |

(Continued)

(52) U.S. Cl.
CPC ............. *C08J 5/18* (2013.01); *B01D 67/002* (2013.01); *B01D 69/02* (2013.01); *B01D 71/76* (2013.01); *B29C 47/0021* (2013.01); *B29C 67/20* (2013.01); *B32B 5/022* (2013.01); *B32B 5/024* (2013.01); *B32B 5/026* (2013.01); *B32B 5/18* (2013.01); *B32B 15/08* (2013.01); *B32B 27/065* (2013.01); *B32B 27/08* (2013.01); *B32B 27/12* (2013.01); *B32B 27/20* (2013.01); *B32B 27/32* (2013.01); *B32B 27/322* (2013.01); *B01D 71/26* (2013.01); *B01D 71/32* (2013.01); *B01D 2323/42* (2013.01); *B01D 2325/02* (2013.01); *B01D 2325/48* (2013.01); *B29C 47/8845* (2013.01); *B29C 47/8895* (2013.01); *B32B 2250/04* (2013.01); *B32B 2255/26* (2013.01); *B32B 2307/21* (2013.01); *B32B 2307/4026* (2013.01); *B32B 2307/518* (2013.01); *B32B 2307/704* (2013.01); *B32B 2307/7145* (2013.01); *B32B 2307/734* (2013.01); *B32B 2457/10* (2013.01); *C08J 2327/02* (2013.01); *C08J 2327/04* (2013.01); *C08J 2327/12* (2013.01); *Y10T 428/249978* (2015.04); *Y10T 442/3366* (2015.04); *Y10T 442/469* (2015.04); *Y10T 442/652* (2015.04)

(58) Field of Classification Search
None
See application file for complete search history.

(56) References Cited

U.S. PATENT DOCUMENTS

| | | |
|---|---|---|
| 4,539,256 A | 9/1985 | Shipman |
| 4,623,670 A | 11/1986 | Mutoh et al. |
| (Continued) | | |

FOREIGN PATENT DOCUMENTS

| | | |
|---|---|---|
| EP | 1 520 880 A2 | 4/2005 |
| JP | 62-192431 | 8/1987 |
| (Continued) | | |

OTHER PUBLICATIONS

Ramaswamy et al., "Fabrication of poly (ECTFE) membranes via thermally induced phase separation", *Journel of Membrane Science*, 210, (2002), pp. 175-180.

*Primary Examiner* — David Browe
(74) *Attorney, Agent, or Firm* — Gregory D. Allen

(57) ABSTRACT

Microporous material having a spherulitic matrix made from ethylene chlorotrifluoroethylene copolymer has a plurality of pores having an average pore size greater than about 0.01 micrometer. The material is made by thermally induced phase separation (TIPS) process that includes melt mixing ethylene chlorotrifluoroethylene copolymer, diluent and nucleating agent to provide a melt mixed composition; shaping the melt mixed composition; cooling the shaped melt mixed composition to induce phase separation of the ethylene chlorotrifluoroethylene copolymer to provide a phase separated material; and stretching the phase separated material to provide the microporous material. The microporous material may be incorporated into articles and the articles may include one, two or more layers of microporous material.

10 Claims, 3 Drawing Sheets

(51) Int. Cl.
    *B29C 47/00*     (2006.01)
    *B01D 71/26*         (2006.01)
    *B01D 71/32*         (2006.01)
    *B29C 47/88*     (2006.01)

(56) References Cited

U.S. PATENT DOCUMENTS

| | | | |
|---|---|---|---|
| 4,702,836 A | | 10/1987 | Mutoh et al. |
| 4,726,989 A | * | 2/1988 | Mrozinski .................. 428/315.5 |
| 5,120,594 A | | 6/1992 | Mrozinski |
| 5,468,782 A | | 11/1995 | Mehan |
| 5,912,278 A | * | 6/1999 | Venkataraman .............. 521/145 |
| 5,976,686 A | | 11/1999 | Kaytor et al. |
| 6,265,074 B1 | | 7/2001 | Shah et al. |
| 6,331,343 B1 | * | 12/2001 | Perez et al. .................... 428/141 |
| 6,420,024 B1 | * | 7/2002 | Perez et al. .................... 428/359 |
| 6,559,192 B2 | | 6/2003 | Maccone et al. |
| 6,632,850 B2 | | 10/2003 | Hughes et al. |
| 7,140,496 B2 | * | 11/2006 | Nagoya et al. ............... 210/490 |
| 7,247,238 B2 | | 7/2007 | Mullette et al. |
| 2003/0198769 A1 | * | 10/2003 | Jing et al. .................. 428/36.91 |
| 2005/0058821 A1 | | 3/2005 | Smith et al. |
| 2007/0157812 A1 | | 7/2007 | Muller |

FOREIGN PATENT DOCUMENTS

| | | |
|---|---|---|
| JP | 07-279024 | 10/1995 |
| JP | 2008-504122 | 2/2008 |
| WO | WO 00/09597 | 2/2000 |
| WO | WO 2005/037917 | 4/2005 |

\* cited by examiner

MICROPOROUS MATERIAL FROM ETHYLENE-CHLOROTRIFLUOROETHYLENE COPOLYMER AND METHOD FOR MAKING SAME

CROSS REFERENCE TO RELATED APPLICATIONS

This is a national stage filing under 35 U.S.C. 371 of PCT/US2009/067807, filed Dec. 14, 2009, which claims the benefit of U.S. Provisional Application No. 61/139,054, filed Dec. 19, 2008, the disclosures of which are incorporated by reference in their entirety herein.

The present invention relates to microporous materials made of ethylene chlorotrifluoroethylene copolymer and to methods of making such materials.

BACKGROUND

The art generally acknowledges the potential utility for microporous materials made from ethylene chlorotrifluoroethylene ("ECTFE") copolymer, a solvent-resistant material. Microporous materials can generally be fabricated using a phase separation process such as "thermally induced phase separation" ("TIPS"). But, a TIPS process has not been used successfully in the fabrication of ECTFE microporous materials that are also capable of enduring further processing such as the removal of diluent and stretching of the material to impart a high degree of porosity. ECTFE membranes have typically lacked the strength needed to withstand being folded and pleated in the manner required to create high surface area filtering materials that are suitable for placement in a filter cartridge, for example.

Nucleating agents have been used in the preparation of microporous materials. While certain materials have been successfully employed as nucleating agents in various polymer systems, known nucleating agents have failed to provide ECTFE microporous materials with a desired morphology that is strong enough to withstand further processing (e.g., stretching, folding).

Methods for introducing nucleating agents into a polymer/diluent system include 'pre-mixing' methods that first require the preparation of a dispersion of nucleating agent in a diluent, typically using a high shear mixer. Alternatively, nucleating agent may first be dispersed in the polymer to make a compounded 'masterbatch.' But, when employed in a TIPS process for the manufacture of ECTFE microporous materials by extrusion, nucleating agents often agglomerate and/or fall out of the solution/dispersion while travelling through the extrusion system. Pre-mixing techniques have generally failed to provide either a sufficiently rapid rate of ECTFE crystallization or a desired morphology (e.g., a spherulitic matrix).

SUMMARY

There is a need for improved ECTFE microporous materials and for articles that include such materials as well as a need for manufacturing such ECTFE microporous materials using nucleating agents in a TIPS process.

In one aspect, the present invention provides a method for the manufacture of a microporous material, the method comprising:

Shaping a melt mixed composition, the composition comprising ethylene chlorotrifluoroethylene copolymer, diluent and nucleating agent wherein the nucleating agent is uniformly dispersed in the melt mixed composition;

Cooling the melt mixed composition to induce phase separation of the ethylene chlorotrifluoroethylene copolymer to provide a phase separated material; and Stretching the phase separated material to provide the microporous material wherein the material comprises:
a spherulitic matrix comprising the ethylene chlorotrifluoroethylene copolymer and a plurality of pores extending through the matrix and having an average pore size greater than about 0.01 micrometer; and
the nucleating agent is substantially uniformly dispersed throughout the ethylene chlorotrifluoroethylene copolymer.

In another aspect, the invention provides a microporous material, comprising:

A spherulitic matrix comprising ethylene chlorotrifluoroethylene copolymer and a plurality of pores extending through the matrix and having an average pore size greater than about 0.01 micrometer; and Nucleating agent substantially uniformly dispersed within the ethylene chlorotrifluoroethylene copolymer.

In another aspect, the invention provides a microporous material, comprising:

A first layer comprising the microporous ECTFE material described above; and

A second layer affixed to the first layer, the second layer comprising a microporous ECTFE material a set forth above.

In still another aspect, the invention provides a microporous material, comprising:

A spherulitic matrix comprising ethylene chlorotrifluoroethylene copolymer and a plurality of pores extending through the matrix; and Nucleating agent substantially uniformly dispersed within the ethylene chlorotrifluoroethylene copolymer;

Wherein, the material has sufficient strength to withstand being flexed, folded, or pleated without breaking.

In still another aspect, the invention provides an assembly, comprising:

A housing having an inlet and an outlet; and

The foregoing microporous ECTFE material disposed within the housing, the microporous ECTFE material being pleated.

In still another embodiment, the invention provides a method for the manufacture of a multilayered microporous ECTFE material, the method comprising:

Shaping a plurality of melt mixed compositions comprising at least a first melt mixed composition and a second melt mixed composition to form a multilayered sheet comprised of a layer of first melt mixed composition and a layer of second melt mixed composition joined together along a common interface, the first melt mixed composition comprising first ethylene chlorotrifluoroethylene copolymer, first diluent and first nucleating agent and the second melt mixed composition comprising a second ethylene chlorotrifluoroethylene copolymer, second diluent and second nucleating agent;

Cooling the multilayered sheet to induce phase separation of the first ethylene chlorotrifluoroethylene copolymer in the first melt mixed composition and the second ethylene chlorotrifluoroethylene copolymer in the second melt mixed composition to thereby provide a multilayered phase separated material; and Stretching the multilayered phase separated material to provide multilayered microporous material having first and second layers, the first layer comprising a first spherulitic matrix of first ethylene chlorotrifluoroethylene copolymer and a first plurality of pores extending through the first matrix and having an average pore size greater than about 0.01 micrometer, the first nucleating agent substantially uniformly dispersed throughout the first ethylene chlorotrifluoroethylene copolymer; the second layer comprising a second spherulitic matrix of second ethylene chlorotrifluoroethylene copolymer and a second plurality of pores extending through the second matrix and having an average pore size greater than about 0.01 micrometer, the second nucleating agent substantially uniformly dispersed throughout the second ethylene chlorotrifluoroethylene copolymer.

In still another aspect, the invention provides a microporous material, comprising:

A first layer comprised of a first spherulitic matrix comprising first ethylene chlorotrifluoroethylene copolymer and a plurality of first pores extending through the first spherulitic matrix and having an average pore size greater than about 0.01 micrometer;

First nucleating agent substantially uniformly dispersed within the first ethylene chlorotrifluoroethylene copolymer;

A second layer comprised of a second spherulitic matrix comprising second ethylene chlorotrifluoroethylene copolymer and a plurality of second pores extending through the second spherulitic matrix and having an average pore size greater than about 0.01 micrometer;

Second nucleating agent substantially uniformly dispersed within the second ethylene chlorotrifluoroethylene copolymer; and Wherein, the average pore size of the first spherulitic matrix and the average pore size of the second spherulitic matrix are different.

Unless otherwise noted, the terms used herein are intended to have a meaning consistent with the understanding of one skilled in the art to which this invention pertains. For clarity, the terms listed below will be understood as having the meanings set forth herein.

"Copolymer" refers to a polymer resulting from the polymerization of two or more different monomers.

When referring to a polymer as being "crystallized," it will be understood that this means that the polymer is at least partially crystalline or semi-crystalline.

"Crystallization temperature" refers to the temperature at which a material (e.g., a polymer) crystallizes.

"Diluent" refers to a material that (1) is mixable with ECTFE copolymer, (2) is able to form a solution with ECTFE copolymer when the mixture is heated above the melt temperature of the ECTFE copolymer, and (3) phase separates from that solution when the solution is cooled below the crystallization temperature of the ECTFE copolymer. "Diluent" encompasses materials that are solid or liquid at ambient temperatures.

"ECTFE copolymer" refers to one or more copolymer(s) of ethylene chlorotrifluoroethylene.

"Nucleating agent(s)" refers to material added to a polymer system to control the initiation and rate of polymer crystallization.

"Spherulite" refers to an individual node or domain of polymer, and "spherulitic matrix" refers to a construction that includes a plurality of spaced, randomly dispersed spherulites connected to one another by radiating fibrils.

These and other aspects of the present invention will be more readily understood upon review of the detailed description of the disclosed embodiments and the appended claims.

BRIEF DESCRIPTION OF THE DRAWINGS

Embodiments of the invention are described with reference to the various Figures, wherein.

DETAILED DESCRIPTION

Figure 1:
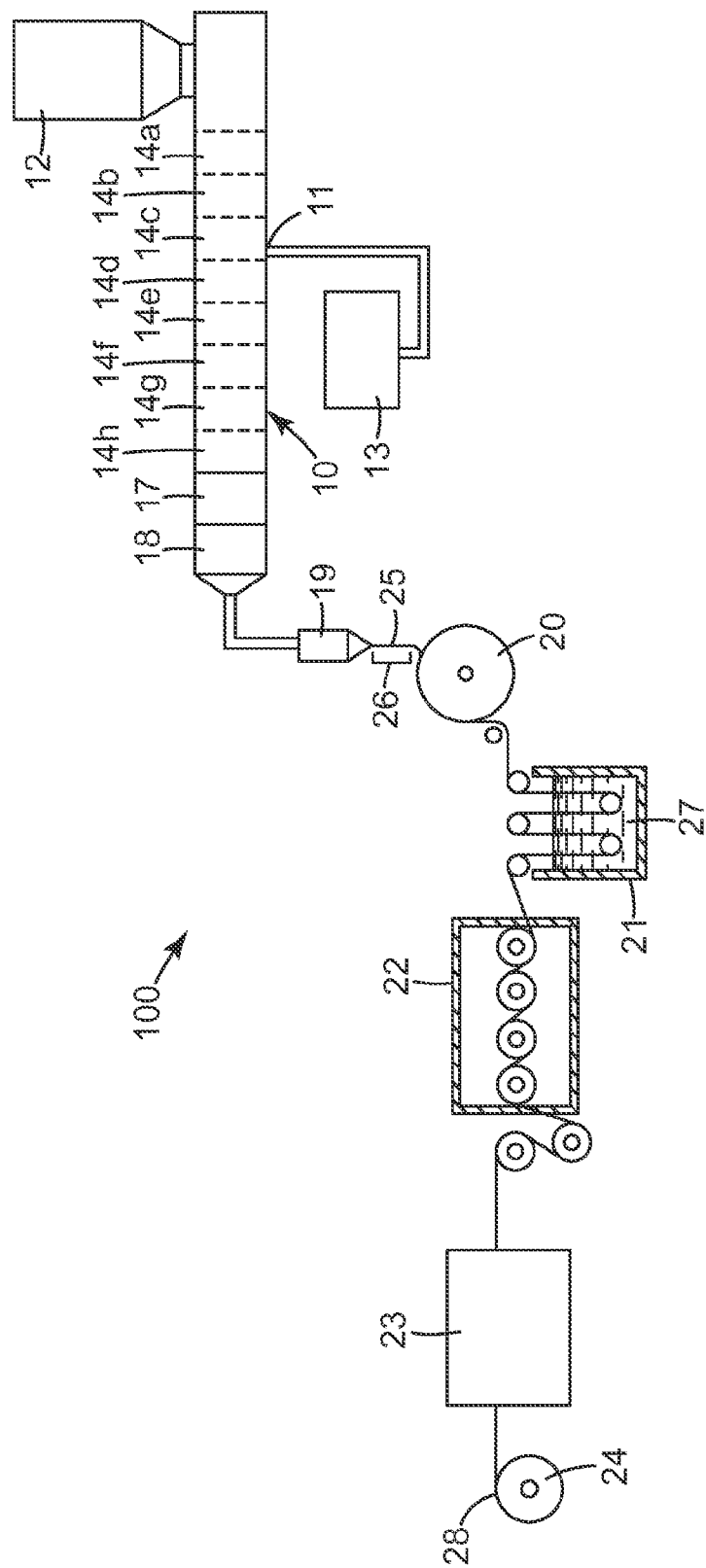
FIG. 1 is a schematic view of an apparatus for producing microporous ECTFE materials according to an embodiment of the invention.

The invention is directed to microporous ECTFE materials and to methods for the manufacture of such materials.

I. Microporous Materials

ECTFE materials of the present invention have a microporous spherulitic matrix in that they include a multiplicity of spaced, randomly dispersed nodes or domains of ECTFE copolymer connected to one another by radiating fibrils with at least one nucleating agent substantially uniformly dispersed throughout the microporous matrix. The microporous ECTFE materials are formed using the process of Thermally Induced Phase Separation ("TIPS") to form a material having an average pore size greater than about 0.01 micrometers (µm). In some embodiments, the average pore size is in the range from about 0.01 µm to about 10.0 µm although some materials may include pore sizes less than 0.01 µm and/or greater than 10.0 µm. In some embodiments, microporous ECTFE materials may be formed as a single layer of material. In some embodiments, two or more microporous layers of ECTFE materials are vertically stacked, one on top of another, as separate layers in a single multilayered article. In such multilayered materials, the different microporous layers of the ECTFE material may have different pore sizes. Other embodiments of the invention may include one or more microporous ECTFE materials on a substrate comprised of material(s) other than ECTFE copolymer. In some embodiments, the microporous ECTFE materials may be formed as a tube, or hollow fiber. The microporous ECTFE materials are suitable for use in any of a variety of applications, as discussed herein.

1. ECTFE Copolymer Matrix Material

Microporous materials within the scope of the invention comprise at least one ECTFE copolymer. ECTFE copolymers are thermoplastic and will melt under ordinary melt processing conditions. Suitable ECTFE copolymers are not limited herein but include any ECTFE copolymer or combination of ECTFE copolymers capable of providing the aforementioned spherulitic matrix material in a TIPS process. In general, suitable ECTFE copolymers comprise partially fluorinated, semi-crystalline (e.g., at least partially crystalline) polymers possessing a combination of mechanical properties.

In some embodiments, suitable ECTFE copolymers include resins available from commercial sources such as those available from Solvay Solexis, Inc. (West Deptford, N.J.) under the trade designation "HALAR" (e.g., HALAR 300, 901 and 902 ECTFE copolymer materials.)

Melt flow index is inversely related to the melt viscosity of ECTFE copolymer, and in some embodiments, ECTFE copolymer is selected to have a medium to high melt viscosity or a low melt index (e.g., @ 275° C. and 2.16 kg). In some embodiments, suitable ECTFE copolymers have a melt index of less than about 2.0 or less than about 1.5.

2. Diluent Materials

In the manufacture of microporous materials according to the invention, ECTFE copolymer is combined with an organic diluent. Suitable diluents include organic esters such as: sebacic acid esters such as, for example, dibutyl sebacate (DBS); phthalic acid esters such as dioctyl phthalate (DOP), diethyl phthalate (DEP); trimellitic acid esters; adipic acid esters; phosphoric acid ester; azelaic acid ester, and combinations of two or more of the foregoing. The amount of diluent used to prepare a microporous materials of the present invention may vary. In embodiments of the invention, a mixture of ECTFE copolymer and diluent is prepared with a weight ratio of ECTFE copolymer/diluent within the range between about 70/30 and about 30/70.

3. Nucleating Agents

Microporous materials prepared according to the present invention utilize at least one nucleating agent to induce, accelerate and enhance the crystallization of ECTFE copolymer during the TIPS process and to provide a film or membrane product that has a strong, uniform microstructure of copolymer domains (e.g., a spherulitic matrix) that form as the ECTFE copolymer crystallizes from a melt. The microstructure is highly porous and exhibits greater stretchability and an improved tensile strength as compared with ECTFE materials previously available.

Nucleating agents are discussed, for example, in U.S. Pat. Nos. 6,632,850 and 4,726,989, the disclosures of which are hereby incorporated by reference in their entireties.

Nucleating agent(s) useful in the present invention may be provided in one of several forms. In some embodiments, suitable nucleating agent is selected from one or more polymers (e.g., polymers other than ECTFE copolymer). In other embodiments, the nucleating agent comprises fine particulates suspended in a polymer base. Nucleating agents are uniformly dispersible in an ECTFE copolymer/diluent in an amount sufficient to initiate crystallization of the ECTFE copolymer at enough nucleation sites to create the aforementioned spherulitic matrix.

In embodiments of the invention, the amount of nucleating agent that is required is no more than about 2.0 wt % of a ECTFE/diluent mixture. In some embodiments, the amount of nucleating agent is between about 0.01 wt % (100 ppm) and about 2.0 wt % of the ECTFE/diluent mixture. In other embodiments, the amount of nucleating agent is no more than about 1.0 wt %, or between about 0.05 wt % and about 1.0 wt %, or between about 0.25 wt % and about 1.0 wt % of the ECTFE/diluent mixture.

Moreover, the use of certain nucleating agents in the TIPS formation of ECTFE microporous materials has allowed for the use of greater amounts of diluent relative to the ECTFE copolymer. This is particularly true in mixtures that include DBS as the diluent. For example, only about a 30-50 wt % diluent level can be mixed with Halar 902 ECTFE when no nucleating agent is used. However, with the inclusion of a suitable nucleating agent, the amount of DBS diluent can be increased up to about 70 wt %.

In some embodiments of the invention, effective nucleating agents for crystallizing ECTFE polymer from a TIPS diluent solution comprise any of a variety of fluoropolymers, including those selected from: copolymers of tetrafluoroethylene and ethylene (ETFE); copolymers of tetrafluoroethylene, hexafluoropropylene and vinylidene fluoride (THV); copolymers of tetrafluoroethylene and hexafluoropropylene (FEP); and combinations of two or more of the foregoing. Commercially available fluoropolymers that are suitable for use as nucleating agents include ETFE copolymer available under the trade designation "ETFE 6235Z" from Dyneon LLC of Oakdale, Minn.; THV copolymer available under the trade designation "THV 815Z" from Dyneon LLC; FEP copolymer available under the designation "FEP 6322Z" from Dyneon LLC; and ETFE copolymers available under the designation "Tefzel" (e.g., Tefzel 200, Tefzel 750, and Tefzel 2188) from DuPont of Wilmington, Del.

Various characteristics of a fluoropolymers are to be considered in the selection of a fluoropolymer as a nucleating agent for use in the TIPS process described herein. In one aspect, a material intended for use as a nucleating agent should be substantially uniformly dispersible in the ECTFE copolymer to form an essentially homogenous melt mixed composition. Additionally, the crystallization temperature of the nucleating agent should be higher than the crystallization temperature of the ECTFE copolymer so that the nucleating agents will crystallize first during cooling of a melt mixed composition, as described herein. In this manner, crystalline particles of fluoropolymers will form and be available to act as true nucleating agents when the ECTFE copolymer reaches its own crystallization temperature. Without wishing to be bound by theory, it is believed that the formation of particulates by a fluoropolymer nucleating agent is required in order for the fluoropolymers to influence and control the crystallization of the ECTFE copolymer and thereby form the desired spherulitic matrix described herein.

In some embodiments, suitable nucleating agent is selected from any of several particulate materials combined with a thermoplastic polymer that is dispersible with ECTFE copolymer and diluent to provide a formulation in which the nucleating agent (e.g. the particulate) remains substantially non-agglomerated and highly dispersed. In such embodiments, the nucleating agent is a particulate material at room temperature (e.g., 20° C.). Thermoplastic polymers include polypropylene or polyethylene homopolymers or copolymers which are mixed with the aforementioned particulates to provide a particulate/polymer mixture in which the particulates are uniformly dispersed. Suitable commercially available particulates include blue copper phthalocyanine pigment "C.I. 15:3," where the olefin is a polypropylene/polyethylene copolymer available from Tokyo Printing Ink Co. of Japan; "HI5-5," a concentrated masterbatch form of a nucleating agent (bicyclo[2.2.1]heptane-2,3-dicarboxylic acid, disodium salt) in polypropylene available from Milliken Chemical Co. of Spartanburg, S.C. The use of particulates as nucleating agents is not limited other than by the ability of a selected particulate material to be substantially uniformly dispersed in the ECTFE copolymer without significant agglomeration during the processing of the ECTFE copolymer to provide a microporous ECTFE material having a spherulitic matrix comprised of micropores having an average pore size greater than about 0.01 µm and, in some embodiments, within the range from about 0.01 µm to about 10.0 µm.

4. Other Additives

Additional ingredients may be added to the ECTFE copolymer/diluent blend, to the nucleating agent or to the blend of ECTFE copolymer/diluent/nucleating agent. Moreover, additives may be added to the material after casting or after stretching of the material, as described herein.

In some embodiments, the optional ingredients are added to the blend of ECTFE copolymer/diluent as melt additives which can include, without limitation, surfactants, antistatic agents, ultraviolet radiation absorbers, antioxidants, organic or inorganic colorants (e.g., dyes or pigments), stabilizers, anti-microbial agents, antifouling compounds, and combinations of any two or more of the foregoing.

An optional ingredient, if present, is generally included at a concentration of no more than about 10 wt % of the copolymer blend (e.g., ECTFE copolymer/diluent/nucleating agent). In some embodiments, the optional ingredient, if present, is included at a concentration of no more than about 5 wt %.

II. Method of Making Microporous ECTFE Materials

As noted, the microporous ECTFE materials of the invention are prepared using a process of Thermally Induced Phase Separation or TIPS. The TIPS process generally involves a melt mixed composition formed by melt blending thermoplastic polymer(s) with diluent and nucleating agent. The diluent and the thermoplastic polymer(s) form a homogeneous solution at an elevated temperature. Upon cooling of the composition below the phase separation temperature of the mixture, the homogeneous solution phase separates to form a polymer-rich phase and a diluent-rich phase.

Phase separation occurs between (i) the thermoplastic polymer(s) and (ii) the diluent, most typically as solid-liquid phase separation. Following phase separation, the resulting material (e.g., film, membrane or the like) is optionally oriented in at least one direction to form a network comprised of interconnected micropores. The diluent may be removed from the material either before or after orienting. The TIPS process is also described in U.S. Pat. Nos. 5,976,686; 4,726,989 and 4,539,256; and 7,338,692, the disclosures of which are incorporated in their entireties herein by reference thereto.

In providing the microporous ECTFE materials of the present invention, the TIPS process involves the following steps: (1) forming one or more substantially uniform and homogenous melt mixed composition(s) comprising a mixture of ECTFE copolymer(s)/diluent(s) and nucleating agent(s); (2) shaping each melt mixed composition; (3) phase separating the shaped melt mixed composition(s) to form phase separated material having one or more microporous layer(s); (4) extracting diluent(s) from the pores of the phase separated material(s); and (5) optionally stretching the phase separated material(s) to maximize the porosity of the microporous ECTFE copolymer material.

In embodiments of the invention, the step (1) of forming a composition comprising a mixture of ECTFE copolymer(s)/diluent(s) and nucleating agent(s) includes melt mixing ECTFE copolymer(s) and diluent(s) and uniformly dispersing nucleating agent(s) into the blend to provide the melt mixed composition. Diluent is miscible with the ECTFE copolymer at temperatures above the melting temperature of the ECTFE copolymer. The concentrations of the various components may vary over a wide range. In some embodiments, ECTFE copolymer is present in the melt mixed composition at a concentration ranging from about 30 wt % to about 70 wt %, diluent is present in the melt mixed composition at a concentration ranging from about 70 wt % to about 30 wt %, and nucleating agent is present in an amount up to about 5 wt %.

In general, nucleating agent(s) is present in the melt mixed composition in an amount sufficient to initiate crystallization of the ECTFE copolymer at a sufficient number of nucleation sites to create a spherulitic matrix and obtain a suitable microporous material. The actual amount of nucleating agent can be less than 0.1 wt % of the melt mixed composition, and in some embodiments less than 0.05 wt % of the melt mixed composition. In specific embodiments, the amount of nucleating agent is from about 0.01 wt % (100 ppm) to about 2 wt % of the melt mixed composition, or from about 0.02 wt % to about 1 wt % of the melt mixed composition.

Nucleating agent serves the functions of inducing crystallization of the ECTFE copolymer from the liquid state and enhancing the initiation of polymer crystallization sites so as to speed up the crystallization of the ECTFE copolymer and/or to increase the number of crystalline nuclei formed as it cools from a molten state. Thus, the nucleating agent is solid or partially solid at the crystallization temperature of the ECTFE copolymer. Where the nucleating agent is a fluoropolymer, it is selected to have a crystallization temperature greater than the crystallization temperature of the ECTFE copolymer so that the nucleating agent will be more likely to crystallize and form solid particulate matter prior to the crystallization of the ECTFE copolymer. Additionally, the presence of nucleating agent(s) in the melt mixed composition appears to facilitate the use of greater concentrations of diluent relative to the concentration of ECTFE copolymer. For example, about a 30-50 wt % diluent level can be mixed with ECTFE copolymer without a nucleating agent while a diluent level of up to about 70 wt % has been observed in the presence of nucleating agent.

The melt mixed composition can be tailored to provide desired properties in the resulting microporous material. For example, properties in the final material can be tailored through variations in the ratio of ECTFE copolymer to diluent, the identity and the amount of the nucleating agent employed, variations in the cooling rate, and by the stretch ratio are used to impart a higher degree of porosity.

In embodiments in which a particulate is used as a nucleating agent, a premixing step may be employed to create a uniform 'pre-dispersion' of nucleating agent in a thermoplastic polymer to provide a "masterbatch" which may then be blended with the ECTFE copolymer and diluent. In other embodiments, the premixing step is not necessary to obtain a substantially uniform dispersion of nucleating agent within the melt mixed composition or in the resulting microporous material. For example, mixing may be accomplished using high shear mixing elements on a twin screw extruder to uniformly distribute nucleating agent within a ECTFE copolymer/diluent melt stream and provide a substantially uniform melt mixed composition.

In embodiments of the invention, the step (2) of shaping the composition is accomplished by extrusion. In such embodiments, melt mixing is also accomplished within an extruder. The melt mixed ECTFE composition is subsequently cast into a shape by extruding it through an extrusion die. The melt mixed composition may be shaped into a film using a sheet die or into a hollow fiber using a hollow fiber die, for example. Other shapes and configurations are contemplated, as will be appreciated by the person of ordinary skill in the art. Melt mixed composition(s) may be cast onto a substrate, into a quench bath, onto a casting wheel, or the like. In some embodiments, a microporous ECTFE material from a melt blended composition is cast onto a patterned chill roll to provide areas where the composition will not contact the surface of the chill roll. The resulting material will be of substantially uniform thickness but having a patterned surface, the patterned surface providing substantially skinless areas having high microporosity and skinned areas of reduced microporosity. Such a method is described in U.S. Pat. No. 5,120,594, the entire disclosure of which is incorporated herein by reference thereto.

In some embodiments, multiple layers of melt mixed compositions are shaped and stacked one on top of another to provide a multilayered sheet. In embodiments that utilize extrusion, two or more extruders may be included within a single system to melt mix different compositions of ECTFE copolymer/diluent/nucleating agent. The melt mixed compositions are co-extruded to form a multilayered sheet in which each of the melt mixed compositions is present in a separate layer.

Melt mixed composition(s) is/are thus transitioned from a heated environment into a cooling environment and phase separation (step (3)) is typically initiated as soon as the composition(s) begins to cool (e.g., upon exiting the extrusion die). As the melt mixed composition(s) cools, ECTFE copolymer(s) begins to crystallize and phase separate from the diluent until crystalline ECTFE has formed a solid spherulitic matrix. In embodiments of the invention utilizing extrusion and employing fluoropolymer as a nucleating agent(s), the gap between the extrusion die and a cooling surface (e.g., a casting wheel, quench bath, etc.), is of sufficient length to permit the melt blended composition(s) to cool to at least the crystallization temperature of the fluoropolymer nucleating agent(s). In this manner, nucleating agent first forms crystalline regions (e.g., particulates) that facilitate or 'seed' the crystallization of ECTFE copolymer upon further cooling.

Variations are contemplated in the TIPS process for cooling the ECTFE composition and inducing crystallization. In some embodiments, further cooling of a melt blended composition is accomplished by casting the composition directly into a quench bath. In other embodiments, cooling is accomplished by casting the melt mixed composition onto a casting wheel where the temperature of the wheel is maintained at a desired temperature below the melting temperature of the pure ECTFE. In some embodiments, melt mixed composition is cooled by casting the composition onto a patterned roll.

Following the step (3) of phase separation, the resulting shaped article is further processed according to step (4) by extracting the diluent from the ECTFE copolymer article using volatile solvent such as the solvent commercially available under the trade designation "Vertrel 423" from DuPont, Wilmington, Del. Following extraction of the diluent, the volatile solvent is evaporated away, leaving behind air voids in the pores of the copolymer previously occupied by the diluent. The porosity of the material can be further enhanced by optionally stretching the article according to step (5). The material may be stretched in at least one direction or in both directions—the down-web direction (also referred to as the longitudinal or the machine direction) as well as the transverse direction or cross-web direction. Stretching further opens the pores of the material and increases its void volume. In some embodiments, the material is stretched in either or both of the machine direction and/or the transverse direction at a stretch ratio ranging from about 1×1 (MD×TD) to about 3×3. Those of ordinary skill in the art will appreciate that other stretch ratios may be used depending on the specific material, its thickness, intended use(s), the desired level of porosity, and the like.

It will be appreciated by the person of ordinary skill in the art, that the microstructure of microporous ECTFE materials can be controlled by the manipulation of various process variables such as: (1) the quench rate (i.e., time for the melt mixed composition to cool and to phase separate), (2) the type of quench employed (e.g., a water bath, quenching in air, or depositing the melt mixed composition onto a smooth or patterned casting wheel), (3) the temperature of the quench; (4) varying the ECTFE copolymer/diluent/nucleating agent weight ratios in the melt mixed composition, and/or (5) using different stretch ratios.

In the cooling of the extruded, melt mixed composition, heat is removed from the melt mixed composition until the article reaches the crystallization temperature of the ECTFE. At that temperature, crystallization and phase separation of the ECTFE copolymer begins.

The shaped microporous ECTFE material (prior to diluent removal and orientation) is typically solid and transparent. The microstructure of the shaped material may be described as (i) possessing spherulites and aggregates of spherulites that comprise (a) ECTFE copolymer and (b) nucleating agent uniformly dispersed within the ECTFE copolymer. The shaped material also includes (ii) diluent occupying the porous space between ECTFE spherulites and associated with amorphous portions of the ECTFE copolymer. The size of the ECTFE spherulites depends on, for example, the concentration of the diluent, the type of nucleating agent, the concentration of the nucleating agent, the degree of dispersion of the nucleating agent throughout the polymer matrix, and the quench temperature.

The shaped material may be oriented or stretched in one or more steps. Through such orienting steps, the ECTFE copolymer is pulled open, attenuating the ECTFE copolymer into a more defined spherulitic matrix having a characteristic node and fibril construction with microscopic voids therebetween that form a network of interconnected micropores. As used herein, "orienting" or "orientation" refers to stretching beyond the material's elastic limit so as to introduce permanent set or elongation of the article, typically to obtain an increase in length of at least about 10% or expressed as a ratio, approximately 1.1 to 1.0. In some embodiments, stretching to provide an elongation of about 10% to about 300% in one or in each of two directions is typical.

Orientation of a microporous ECTFE material is accomplished using any device that can provide the desired degree of stretching in at least one direction or, in some embodiments, stretching in both the machine and transverse directions. Orientation of a material in two directions may be accomplished either by sequentially or by simultaneously stretching the material in both directions. Generally, orientation of an article is accomplished by stretching the material in a manner that results in substantially uniform and controlled porosity. Following orientation, the microporous ECTFE material may be dimensionally stabilized using known annealing techniques.

In some embodiments, stretching of the material in the cross or transverse direction at elevated temperatures can significantly influence the resulting pore size and overall porosity of the final ECTFE material. In such embodiments, as the temperature increases, pore size and overall porosity of the final ECTFE material also increases. Surprisingly, in some instances, the thickness of the stretched ECTFE material can increase. Moreover, ECTFE materials stretched in the cross direction may be exposed to multiple temperatures during stretching in the cross direction. Such multiple temperatures may be provided, for example, in a multi-zone tenter oven as is exemplified herein.

The nucleated materials have a microporous structure characterized by a multiplicity of microscopically identifiable spherulites that appear as uniformly dispersed, equiaxed, nodal polymer particles linked to one another by interconnecting fibrils. In such a construction, nucleating agent is substantially uniformly dispersed throughout the ECTFE construction. As used herein, the term "equiaxed" means having approximately equal dimensions in all directions. Following extraction of diluent and subsequent stretching, the pores of the material appear substantially clear.

Referring to FIG. 1, a system 100 is schematically depicted for the manufacture of microporous ECTFE materials via a TIPS process, according to the present invention. System 100 includes extruder 10 equipped with hopper 12 and including a plurality of heated zones 14a-h. ECTFE copolymer is introduced into system 100 through hopper 12 which directs the component into extruder 10. Diluent is added to the ECTFE copolymer by pumping the diluent from reservoir 13 into extruder 10 via port 11 in the wall of the extruder between hopper 12 and extruder exit 17. Port 11 may be positioned in other locations along the length of the extruder 10. In some embodiments, the port 11 may be proximate to the hopper 12, for example. Nucleating agent may be pre-mixed with the diluent and initially contained within the reservoir 13 or it may be premixed with ECTFE copolymer in hopper 12.

Once in the extruder 10, the components are directed through the heated zones 14a-h by the screw(s) (not shown) of the extruder. While the extruder 10 is shown to include eight heated zones 14a-h, it will be appreciated that the inclusion of a greater or lesser number of heated zones is a matter of design choice made by the person of ordinary skill in the art. Heated zones 14a-h can be set to provide any desired temperature profile. In some embodiments, the first zones 14a-14d are set at higher temperatures than zones 14e-14h with the higher temperatures being sufficient to melt all of the components into a homogenous melt blended composition. Lower temperatures in zones 14e-14h are sufficient to maintain the homogenous melt blended composition without degrading the ECTFE copolymer or other components. It will be appreciated that the actual temperature profile of the zones 14a-h will vary depending on the specific properties of the components that are being used, on the viscosity of the melt blended composition, and on various processing considerations, as known by the person skilled in the art of polymer extrusion. In some embodiments, all of the heated zones 14a-h are maintained at substantially the same temperature. In still other embodiments, the zones 14a-h will provide a temperature profile in which all of the individual zones are set at unique temperature (e.g., none of the zones 14a-h will have a temperature the same as the temperature of any other zone). In still other embodiments, zones 14a-h are maintained at progressively decreasing temperatures (e.g. zone 14a has the highest temperature). Other temperature profiles are also contemplated. While passing through zones 14a-h of extruder 10, the melt mixed composition is heated to a temperature of at least about 5° C. above the melting temperature of the ECTFE copolymer but below its thermal degradation temperature.

ECTFE copolymer, diluent and nucleating agent are melt blended within extruder 10 as the melt blended composition progresses through zones 14a-h and then towards extruder exit 17. Slot die 19, positioned after extruder 10, is preset to have an appropriate gap width which, in some embodiments, is between about 25 and about 2000 micrometers. Static mixer 18 is positioned between extruder exit 17 and slot die 19 to facilitate further blending of the melt mixed composition.

In embodiments of the invention wherein a fluoropolymer is used as a nucleating agent, the length of gap 26, as measured from slot die 19 to quench wheel 20, is of a suitable length to allow the melt mixed composition 25 to sufficiently cool so that the fluoropolymer nucleating agent can begin to crystallize while the composition is still in the gap 26 (e.g., before being picked up by quench wheel 20). Because the fluoropolymer is selected to have a crystallization temperature higher than the crystallization temperature of the ECTFE copolymer, the melt mixed composition will first reach the crystallization temperature of the fluoropolymer during the cooling process and before reaching the crystallization temperature of the ECTFE copolymer. Hence, cooling of the melt mixed composition 25 during its residence time in the gap 26 should be sufficient to crystallize the fluoropolymer nucleating agent without crystallization of the ECTFE copolymer. It will be appreciated by those of ordinary skill in the art that the residence time of the melt mixed composition 25 within gap 26 will be influenced by the temperature of the melt mixed composition as it exits the die 19, by control of the rotational speed of the quench wheel 20, by changing the length of the gap 26, or the like.

The extruded melt mixed composition 25 is deposited as a layer onto quench wheel 20 which is maintained at a temperature below the crystallization temperature of the ECTFE copolymer. The composition continues to cool as it contacts and travels on quench wheel 20. Once at or below the ECTFE crystallization temperature, the ECTFE copolymer will crystallize around the particles or crystals of nucleating agent. As it crystallizes, the ECTFE copolymer phase separates and forms a spherulitic matrix having a network of pores filled with the remaining diluent and having nucleating agent substantially uniformly dispersed throughout the ECTFE copolymer. The thus cooled melt mixed composition is transformed into a phase separated article and is conveyed from quench wheel 20 to solvent bath 21 where the material is exposed to a solvent 27 (e.g., the solvent available under the trade designation "Vertrel 423" from DuPont, Wilmington, Del.) for the extraction of diluent and then air dried. The phase separated material is next conveyed to optional machine-direction ("MD") stretching device 22 and to optional sequentially aligned transverse-direction ("TD") stretching device 23 to provide a microporous ECTFE copolymer material that is porous, essentially diluent free, and comprised of a spherulitic matrix with a fully opened porous structure. The microporous material is conveyed to a take-up roller 24 and wound into a roll 28. In other embodiments, machine-direction stretching device 22 and transverse-direction stretching device 23 may be replaced with a simultaneous biaxial stretching unit for biaxial (MD×TD) stretching of the material.

In variations of the foregoing system 100, the system may be configured to include an in-line coating station (not shown) and/or drying oven (not shown) positioned between TD stretching device 23 and take-up roller 24 to provide a coating on one or both outer surfaces of the stretched material. Further, solvent bath 21 may be re-positioned to be between TD stretching device 23 and take-up roller 24 to extract diluent after one or more stretching steps.

In other embodiments, the system 100 can be reconfigured to allow for the manufacture of microporous ECTFE materials in the form of hollow fibers. In such a configuration, die 19 is a hollow fiber die.

Figure 2:
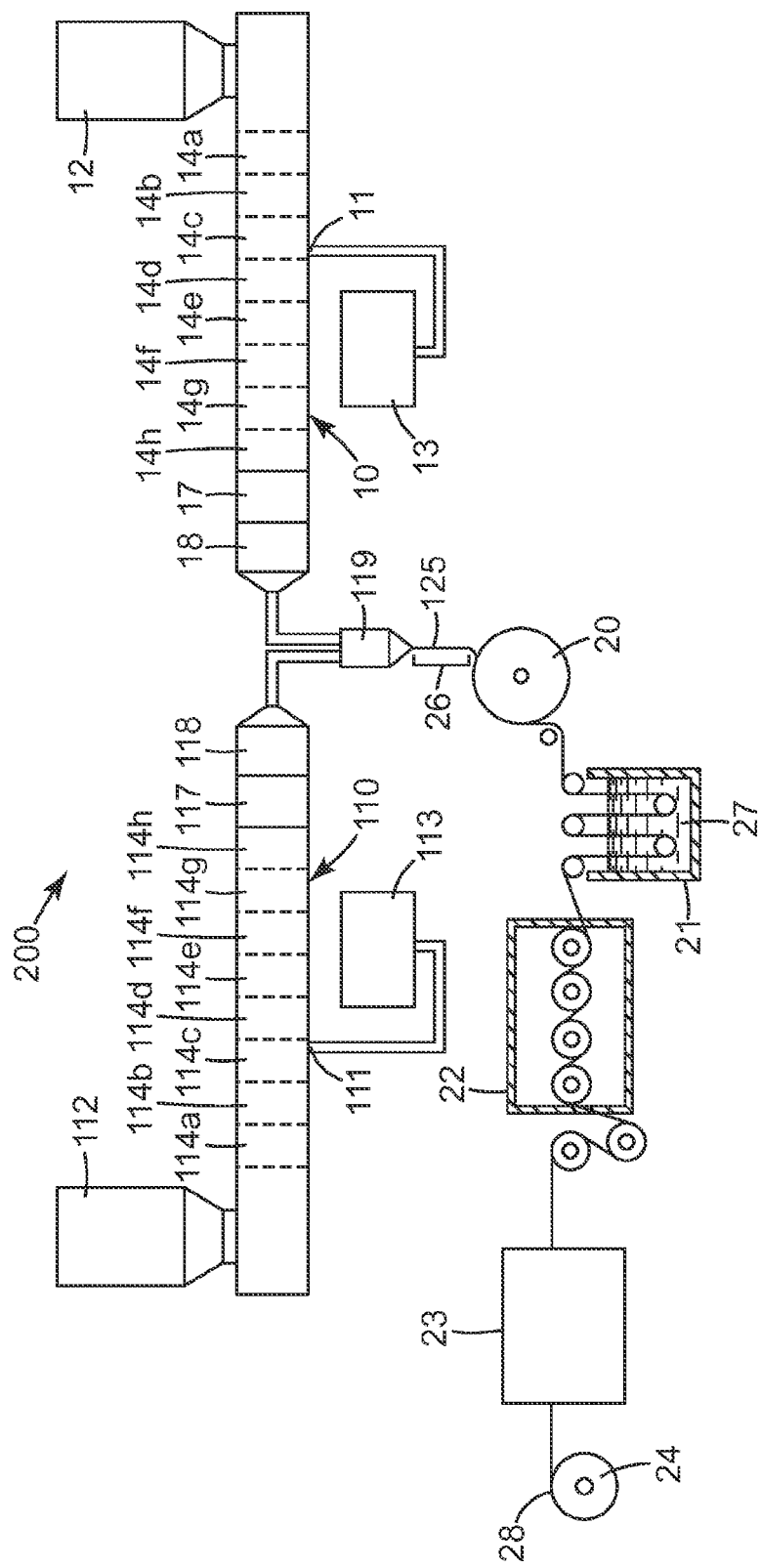
FIG. 2 is a schematic view of an apparatus for producing microporous ECTFE materials according to another embodiment of the invention.

Referring to FIG. 2, another embodiment of a system 200 configured for the manufacture of multilayered microporous ECTFE materials, according to the present invention, is shown and will now be described. "Multilayered" materials are materials having two or more microporous layers joined together along a common interface. In describing system 200, includes first extruder 10, as previously described. It will be noted that components of the system 200 that are essentially the same as those previously described for the system 100 (FIG. 1) are identified with the same reference numerals with limited additional discussion. In referring to ECTFE copolymer, diluent and nucleating agent referred to in the discussion of the system 100, such materials may be referred to herein as "first ECTFE copolymer," "first diluent" and "first nucleating agent." Likewise, the melt mixed composition resulting from the combination of first ECTFE copolymer, first diluent and first nucleating agent may be referred to as "first melt mixed composition."

System 200 includes second extruder 110 equipped with hopper 112 and a plurality of heated zones 114*a-h*. Second ECTFE copolymer is introduced into system 200 through hopper 112 which directs the component into extruder 110. Second diluent is added to the second ECTFE copolymer by pumping the second diluent from reservoir 113 into second extruder 110 via port 111 in the wall of the extruder between hopper 112 and extruder exit 117. Port 111 may be positioned in other locations along the length of the extruder 110. In some embodiments, the port 111 may be proximate to the hopper 112, for example. Second nucleating agent may be pre-mixed with second diluent and initially contained within the reservoir 113 or it may be premixed with second ECTFE copolymer in hopper 112. In some embodiments, one or more of the second ECTFE copolymer, second diluent and second nucleating agent added to hopper 112 are the same as first ECTFE copolymer, first diluent and first nucleating agent added to the hopper 12 though weight percentages or weight ratios may be changed. In other embodiments, second ECTFE copolymer, second diluent and second nucleating agent added to hopper 112 are different than first ECTFE copolymer, first diluent and first nucleating agent.

Once in the extruder 110, the components are directed through the heated zones 114*a-h* by the screw(s) (not shown) of the extruder. While the extruder 110 is shown to include eight heated zones 114*a-h*, it will be appreciated that the inclusion of a greater or lesser number of heated zones can be a matter of design choice made by the person of ordinary skill in the art. Heated zones 114*a-h* can be set to provide any desired temperature profile. In some embodiments, the first zones 114*a*-114*d* are set at higher temperatures than zones 114*e*-114*h* with the higher temperatures being sufficient to melt all of the components into a homogenous second melt blended composition. Lower temperatures in zones 114*e*-114*h* are sufficient to maintain the homogenous second melt blended composition without degrading the second ECTFE copolymer or other second components. It will be appreciated that the actual temperature profile of the zones 114*a-h* will vary depending on the specific properties of the second components that are being used, on the viscosity of the second melt blended composition, and on various processing considerations, as known by the person skilled in the art of polymer extrusion. In some embodiments, all of the heated zones 114*a-h* are maintained at substantially the same temperature. In still other embodiments, the zones 114*a-h* will provide a temperature profile in which all of the individual zones are set at unique temperature (e.g., none of the zones 114*a-h* will have a temperature the same as the temperature of any other zone). In still other embodiments, zones 114*a-h* are maintained at progressively decreasing temperatures (e.g. zone 114*a* has the highest temperature). Other temperature profiles are also contemplated. While passing through zones 114*a-h* of extruder 110, the second melt mixed composition is heated to a temperature of at least about 5° C. above the melting temperature of the second ECTFE copolymer but below its thermal degradation temperature. Second ECTFE copolymer, second diluent and second nucleating agent are melt blended within extruder 110 as the second melt blended composition progresses through zones 114*a-h* and then towards extruder exit 117. Static mixer 118 is positioned between extruder exit 117 and multizone die 119 to facilitate further blending of the melt mixed composition.

Multizone die 119, is positioned to receive feeds of melt blended composition coming from both extruders 10 and 110 and to maintain the feeds as separate streams as they pass through the die and enter the gap 26. Die 119 is equipped with two gap widths, one for each melt blended composition. In some embodiments, the gap widths are between about 25 and about 2000 micrometers, and the two widths can be set to be the same or they can be different. In various embodiments, first and second melt blended compositions produced in extruders 10 and 110, respectively, are formulated differently from one another in at least one feature or one component so that the resulting material produced by each of the melt blended compositions has an average pore size or a pore size distribution that is different than the material resulting from the other melt blended composition. For example, the two melt blended compositions may be formulated with different ECTFE copolymers or different diluents or with different nucleating agents. In some embodiments, the formulations of the melt blended compositions utilize the same components but at different concentrations for one or more of those components. Other such possible variations will be apparent to the person of ordinary skill in the art.

The two melt blended compositions are extruded through the multizone die 119 in two streams which adhere to one another to from a multilayered sheet 125 having two distinct layers, each layer formed by one of the melt blended compositions. In embodiments of the invention wherein fluoropolymer is used as nucleating agent in one or both of the melt blended compositions, the length of gap 26, as measured from die 119 to quench wheel 20, is of a suitable length to allow the melt mixed compositions in the multilayered sheet 125 to sufficiently cool to crystallize the fluoropolymer nucleating agent while the multilayered sheet is still within the gap 26 (e.g., prior to contacting quench wheel 20. Because the fluoropolymer is selected to have a crystallization temperature higher than the crystallization temperature of the ECTFE copolymer, the multilayered sheet will first reach the crystallization temperature of the fluoropolymer during the cooling process and before reaching the crystallization temperature of the ECTFE copolymer. Hence, cooling of the multilayered sheet 125 during its residence time in the gap 26 should be sufficient to crystallize the fluoropolymer without crystallization of the ECTFE copolymer. It will be appreciated by those of ordinary skill in the art that the residence time of the multilayered sheet 125 within gap 26 will be influenced by the temperature of the melt mixed compositions as they exit the die 19, by control of the rotational speed of the quench wheel 20, by changing the length of the gap 26, or the like.

The multilayered sheet 125 is deposited onto quench wheel 20 which is maintained at a temperature below the crystallization temperature of ECTFE copolymer. The multilayered sheet 125 continues to cool as it contacts and travels on quench wheel 20. Once at or below the ECTFE crystallization temperature, the ECTFE copolymer will crystallize around the crystalline particles of nucleating agent. As it crystallizes, ECTFE copolymer in each melt mixed composition phase separates and forms a spherulitic matrix having a network of pores filled with the remaining diluent and having nucleating agent substantially uniformly dispersed throughout the ECTFE copolymer. The thus cooled melt mixed compositions transform the multilayered sheet into a multilayered phase separated material which is conveyed from quench wheel 20 to solvent bath 21 where the material is exposed to a solvent 27 to extract diluent, and the material is then air dried. The multilayered phase separated material is next conveyed to optional machine-direction ("MD") stretching device 22 and to optional sequentially aligned transverse-direction ("TD") stretching device 23 to provide a multilayered microporous ECTFE copolymer material that includes a first layer and a second layer forming two distinct porous zones. The multilayered microporous ECTFE copolymer material is essentially diluent free, and each zone is comprised of a spherulitic matrix with a fully opened porous structure. The multilayered microporous material is then conveyed to a take-up roller 24 and is wound into a roll 28. In other embodiments, machine-direction stretching device 22 and transverse-direction stretching device 23 may be replaced with a simultaneous biaxial stretching unit for a single biaxial (MD×TD) stretching of the material.

The resulting multizone microporous ECTFE material is a composite material comprised of a first microporous zone and a second microporous zone and joined together along a common interface. Differences in the formulations of the first and second melt mixed compositions result in differences in the average pore size and/or the pore size distribution of the two zones so that the first zone will typically have a larger average pore size than the average pore size of the second zone.

In some embodiments, the multizone microporous ECTFE material may include more than two microporous zones of ECTFE material (e.g., up to three, four, five zones, etc.), and each the various zones may have a unique average pore size. In some embodiments, two or more layers may have substantially the same pore sizes. In other embodiments, a multizone microporous ECTFE material may be affixed by lamination or the like to a substrate (e.g., other than a microporous ECTFE material). Other variations of such articles may be apparent to the person of ordinary skill in the art.

Microporous ECTFE materials of the present invention typically provide high porosities (e.g., 60% or greater), with average pore sizes being within the range from about 0.1 μm to about 10 μm. The microporous ECTFE materials are suitable for use in any of a variety of applications including, but not limited to, ultra and microfiltration application devices for use in the health care, food & beverage, and/or industrial markets. The microporous ECTFE materials may be used as membranes, films and/or as components in any of a variety of articles. Exemplary applications for such microporous ECTFE materials include microparticle filtration (e.g., red blood cells and yeast), fuel cell and battery separator applications and as vent filters. The microporous ECTFE materials provided by the invention are typically very strong as compared with ECTFE materials previously available. The ECTFE materials of the invention are typically capable of being flexed, folded, or pleated without breaking or crumbling to the touch, making them suitable for use in a filter cartridge or in other devices requiring high surface area materials for filtration applications or the like.

Microporous ECTFE materials may be incorporated into other articles such as filter cartridges, for example. Other potential applications for the microporous ECTFE materials are also contemplated.

Moreover, microporous ECTFE materials may be further treated to provide specific functions. In some embodiments, the ECTFE materials are imbibed with another material following the removal of diluent. Imbibing of the microporous ECTFE material may be accomplished using known methods including, for example, multiple dipping, long soak, vacuum, hydraulic press and evaporation. Microporous ECTFE materials may be imbibed with any of a variety of materials such as pharmaceuticals, antimicrobials, antistatic agents, surfactants, pesticides, solid particulate materials and the like. The foregoing materials are added to the microporous ECTFE material to at least partially fill the pore space therewithin.

In some embodiments, the microporous ECTFE materials described herein may be further modified (either before or after removal of the diluent) by depositing any one of a variety of compositions thereon using known coating or deposition techniques. For example, the microporous ECTFE material may be metal coated using vapor deposition or sputtering techniques, or the microporous material may be coated with adhesive, aqueous or solvent based coating compositions or dyes, for example.

In some embodiments, unique articles are provided by laminating microporous ECTFE material to another structure or material, such as other sheet materials (e.g., layers, woven, nonwoven, knitted, or mesh fabrics), polymeric film layers, metal foil layers, foam layers, or any combination thereof to provide composite structures. Lamination can be accomplished using conventional techniques that include adhesive bonding, spot welding, or by other techniques that do not destroy or otherwise interfere with porosity.

EXAMPLES

Additional embodiments of the present invention are further illustrated in the following non-limiting Examples.
Manufacture of Microporous ECTFE materials Microporous ECTFE materials were made using a twin screw extruder equipped with a melt pump, neck tube, and sheeting die positioned above a patterned casting wheel or a hollow fiber die positioned above a water-filled quench bath. The microporous materials were made in steps consisting of: melt extrusion; casting/quenching; solvent washing to remove the diluent; drying to remove the solvent; and stretching. The samples were then characterized for pore size, porosity, thickness, and resistance to water flow.
Materials:

The following materials are referred to in the various examples:

Polymers: ECTFE fluoropolymers commercially available under the trade designations "Halar 902," "Halar 901," and "Halar 300 DA" from Solvay Solexis, New Jersey, USA.

Diluent: Dibutyl sebacate ("DBS") commercially obtained from Vertellus Performance Materials, Greensboro N.C.).

Nucleating Agents:

HI5-5, a concentrated masterbatch form of Hyperform® HPN68L nucleating agent (bicyclo[2.2.1]heptane-2,3-dicarboxylic acid, disodium salt) in polypropylene, obtained from Milliken Chemical Co., Spartanburg, S.C.

Olefin/blue, a masterbatch of 20 wt % blue copper phthalocyanine pigment C.I. 15:3 (Tokyo Printing Ink Co. Japan), in a polypropylene/polyethylene copolymer having a melt flow index of 12.

Fluoropolymers obtained from 3M Company, St. Paul, Minn. under the designations "ETFE 6235," "THV 815," "FEP 6322."

ETFE fluoropolymers obtained from Dupont of Wilmington, Del. under the trade designations "Tefzel 200," "Tefzel 750," "Tefzel 2188."

Test Methods

The following test methods were used to characterize the microporous materials produced in the examples:

Test Method—Thickness: The thickness of a material was measured to the thousandths of an inch using a TMI caliper gauge (Testing Machines Inc., Amityville N.Y.). The measurement was converted into microns.

Test Method—Bubble Point: The Bubble Point pore size is the bubble point value representing the largest effective pore size in a sample, measured in microns, according to ASTM-F-316-80.

Test Method—Porosity: Porosity was calculated from the measured bulk density and known pure ECTFE copolymer density using the following equation:

Porosity=(1−bulk density/ECTFE copolymer density)×100

Bulk density was determined by multiplying the weight of a 47 mm diameter disc of material times by a conversion factor of 22.69 and dividing the result by the thickness of the material in inches, as follows:

Bulk density=(weight of 47 mm disc)×(conversion factor 22.69)/thickness (inches).

Test Method—Water Flow Resistance:

The Water Flow Resistance test is the measure of time in seconds it takes to pass 100 cc of deionized water through a 47 mm disc of material under a vacuum pressure of about 580 mm Hg. If necessary the membrane is pre-wet with alcohol to initiate wetting with water. A low value (in seconds) indicate a high water flux.

Examples 1-10

Microporous ECTFE materials were prepared using the components and concentrations shown in Table 1. The materials of the Examples were tested for their properties according to the Test Methods described herein, and the results of that testing are set forth in Table 2.

TABLE 1

| Ex. | ECTFE 901 (wt %) | ECTFE 902 (wt %) | DBS (wt %) | Nucleating Agent (type) | Nucleating Agent masterbatch (wt %) | Pure NA (wt %) | Stretch Ratio MD × TD |
|---|---|---|---|---|---|---|---|
| 1 | 50.7 | 0 | 45.0 | Olefin/blue | 4.00 | 0.30 | 1.5 × 1.5 |
| 2 | 50.7 | 0 | 45.0 | Olefin/blue | 4.00 | 0.30 | 2 × 2 |
| 3 | 40.0 | 0 | 55.0 | Hi5-5 | 4.50 | 0.50 | 1.5 × 1.5 |
| 4 | 40.0 | 0 | 55.0 | Hi5-5 | 4.50 | 0.50 | 2 × 2 |
| 5 | 0 | 42.0 | 55.0 | Olefin/blue | 2.78 | 0.22 | 2 × 2 |
| 6 | 0 | 39.5 | 57.5 | Olefin/blue | 2.78 | 0.22 | 2 × 2 |
| 7 | 0 | 37.0 | 60.0 | Olefin/blue | 2.78 | 0.22 | 1.75 × 1.75 |
| 8 | 0 | 43.61 | 55.0 | Olefin/blue | 1.39 | 0.11 | 1.75 × 1.75 |
| 9 | 0 | 43.61 | 55.0 | Olefin/blue | 1.39 | 0.11 | 2.0 × 2.0 |
| 10 | 0 | 43.61 | 55.0 | Olefin/blue | 1.39 | 0.11 | 2.25 × 2.25 |

TABLE 2

| Ex. | Thick (mils) | Pore Size (um) | Porosity (%) | Water Flow Resistance (sec/100 cc) |
|---|---|---|---|---|
| 1 | 4.7 | 0.7 | 67.5 | 60 |
| 2 | 4.3 | 1.0 | 73.6 | 23 |
| 3 | 10.6 | 1.7 | 76.5 | 10 |
| 4 | 10 | 2.5 | 81.3 | 5 |
| 5 | 3.0 | 0.24 | 62.3 | — |
| 6 | 4.1 | 0.43 | 74.0 | 54 |
| 7 | 5.3 | 0.95 | 73.3 | 27 |
| 8 | 2.8 | 0.250 | 60.0 | — |
| 9 | 2.5 | 0.125 | 70.0 | — |
| 10 | 1.8 | 0.112 | 60.0 | — |

Example 11

A microporous ECTFE material was made by extrusion of a melt blended composition (Halar 902 ECTFE copolymer, 0.22 wt % DBS and Olefin/blue nucleating agent as in Example 5) through a hollow fiber die and cast into a water-filled quench bath maintained at 120° F. (49° C.). The resulting material was a porous ECTFE hollow fiber. The hollow fiber was washed in solvent to remove the DBS diluent, dried, and stretched in hot air at 250° F. (121° C.), 2:1 times in the machine direction. Isopropyl alcohol instantly wet the fiber indicating it was porous.

Comparative Example A

A melt blended composition was prepared with same ratio of ECTFE copolymer (Halar 901 resin) and diluent (DBS) as in Example 1 but without nucleating agent. The composition was extruded into a sheet. The resulting material lacked integrity and would break/crumble upon touching.

Comparative Example B

A melt mixed composition was prepared as in Example 1 using the same ratio of Halar 901 ECTFE and DBS diluent but using only blue copper pigment as a nucleating agent (no polypropylene) which was pre-dispersed in the DBS diluent using a high shear mixer. The dispersion was fed with a gear pump into the second zone of a eight zoned twin screw extruder and melt mixed with ECTFE/DBS to provide a melt mixed composition. Once the melt mixed composition exited the screws of a twin screw extruder and prior to reaching the sheet die, the nucleating agent fell out of suspension and formed a separate stream out of the die, leaving the particulate unavailable to nucleate the ECTFE copolymer. The resulting material had no integrity and broke apart and crumbled when touched.

Comparative Example C

The same ratio of Halar 901 and DBS as in Example 1, was extruded, except pure 12 MFI PP at about 3.2 wt % (a typical resin used to make masterbatch blends) was fed into the extruder and melt mixed with the ECTFE/DBS and formed into a film. It had no integrity and could not be touched without breaking or crumbling. The PP without the NA pre-dispersed in it, did not nucleate the ECTFE upon quenching.

Example 12

A microporous ECTFE material was prepared using a 25 mm twin screw extruder equipped with a hopper, eight zones with independent temperature controls and a liquid reservoir for supplying diluent to the extruder. Halar 902 ECTFE copolymer pellets and ETFE 6235 nucleating agent were introduced into the hopper using a solids feeder and the materials were fed into the extruder which was maintained at a screw speed of 150 rpm. DBS diluent was fed separately from the reservoir into extruder. The weight ratio of ECTFE copolymer/diluent/nucleating agent was 54.5/45.0/0.5. The total extrusion rate was about 2.72 kg/hr and the extruder's eight zones were set to provide a temperature profile for zones 1 to 8 of 204° C., 254° C., 260° C., 260° C., 227° C., 227° C., 227° C., and 227° C. The resulting melt mixed composition was uniformly mixed and subsequently pumped through a double-chromed coat-hanger slot film die maintained at 227° C., and cast onto patterned casting wheel maintained at a wheel temperature of 77° C. with a casting speed of 0.82 m/min to form a sheet-like shaped melt-mixed composition.

The gap between the film die and the casting wheel was 1.9 cm which was believed to be large enough to allow the ETFE polymer nucleating agent to crystallize prior to significant crystallization the ECTFE copolymer. A faint opaque frost line developed within the molten polymer mixture in the air gap before the mixture contacted the casting wheel. The resulting film was mounted on a frame to keep it from shrinking and was washed off-line in a solvent commercially obtained from DuPont under the trade designation "Vertrel 423" and then air dried. The washed film was sequentially oriented in the length and cross direction on a lab stretcher 2.0×2.25 at 137° C.

The microporous ECTFE material was evaluated and found to be very strong and capable of being flexed, folded, or pleated without breaking or crumbling to the touch. It had an average film thickness of 46 µm; a bubble point pore size of 0.38 µm; a porosity of 58.0%; and a resistance to water flow of 106 sec/100 cc.

Example 13

A microporous hollow fiber of ECTFE was made from a melt blended composition similar to Example 12, except that the composition was extruded through a hollow fiber die and spun in air for approximately one meter before being collected. The resulting material was washed in solvent to remove the DBS diluent, dried, and stretched in hot air at 160° C. at a stretch ratio of 2:1 in the machine direction. The microporous ECTFE material had a bubble point pore size of 0.74 um, and a resistance to water flow of 16.2 sec/cc/cm$^2$@ 584 mm Hg.

Example 14

A microporous hollow fiber of ECTFE was made from a melt blended composition similar to the previous Example 13 except it was stretched in hot air at a temperature of 132° C. at a stretch ratio of 2:1 times in the machine direction. The microporous ECTFE material had a bubble point pore size of 0.18 um, and resistance to water flow of 146 sec/cc/cm2 @ 584 mm Hg.

Comparative Example D

A microporous ECTFE material was prepared as in Example 12 but with no nucleating agent. The ECTFE copolymer/diluent ratio was 55/45. A frost line was observed in the air gap between the film die and the casting wheel. The cast film was washed and the resulting material was stretched and had the following properties: an average film thickness of 99 µm; a bubble point pore size of 0.50 µm; a porosity of 75.8%; and a resistance to water flow of 212 sec/100 cc. The material broke when flexed, folded, and pleated.

Example 15

A microporous material was prepared as in Example 12 except Tefzel 200 ETFE polymer was used the nucleating agent and the temperature of the extruder zones 3 through 6 were maintained at 260° C. to adequately melt and uniformly mix the nucleating agent into a uniformly dispersed melt mixed composition. The resulting microporous material had the following properties: an average film thickness of 46 µm; a bubble point pore size of 0.20 µm; a porosity of 58.0%; and a resistance to water flow of 308 sec/100 cc. The material was very strong and capable of being flexed, folded, or pleated without breaking or crumbling.

Example 16

A microporous material was prepared as in Example 12 except THV 815 fluoropolymer was used as the nucleating agent and the temperature of the extruder zones 3 through 6 were maintained at 260° C. The resulting microporous material had the following properties: an average film thickness of 48 µm; a bubble point pore size of 0.40 µm; a porosity of 69.8%; and a resistance to water flow of 78 sec/100 cc. The material was evaluated and found to be very strong and capable of being flexed, folded, or pleated without breaking or crumbling.

Example 17

A microporous material was prepared as in Example 12 except FEP 6322 fluoropolymer was used as the nucleating agent and extruder zones three through six were set at 288° C. The microporous material had the following properties: an average film thickness of 71 µm; a bubble point pore size of 4.5 µm; a porosity of 60.1%; and a resistance to water flow of 76 sec/100 cc. The material was of moderate strength and broke when flexed, folded, and pleated.

Example 18

A microporous material was prepared as in Example 12 except Tefzel 2188 ETFE fluoropolymer was used as the nucleating agent and the temperatures of the extruder zones 3 through 6 were maintained at 260° C. The resulting microporous material had the following properties: an average film thickness of 46 µm; a bubble point pore size of 0.29 µm; a porosity of 61.4%; and a resistance to water flow of 120 sec/100 cc. The material was very strong and capable of being flexed, folded, or pleated without breaking or crumbling to the touch.

Example 19

A microporous material was prepared as in Example 12 except Tefzel 750 ETFE fluoropolymer was used as the nucleating agent and the temperatures of the extruder zones 3 through 6 were maintained at 260° C. The resulting microporous material had the following properties: an average film thickness of 38 μm; a bubble point pore size of 0.18 μm; a porosity of 57.0%; and a resistance to water flow of 432 sec/100 cc. The material was very strong and capable of being flexed, folded, or pleated without breaking or crumbling to the touch.

Example 20

A microporous material was prepared as in Example 12 except Halar 901 was used as the ECTFE copolymer and ETFE Tefzel 200 fluoropolymer was used as the nucleating agent. The polymer/diluent/nucleating ratio was 64.5/36/0.5 wt %, the temperatures of the extruder zones 3 through 6 were maintained at 260° C., the casting wheel speed was 1.2 m/min, and the film stretch ratio was 2×2. The resulting microporous material had the following properties: an average film thickness of 23 μm; a bubble point pore size of 0.30 μm; a porosity of 57.1%; and a resistance to water flow of 162 sec/100 cc. The material was very strong and capable of being flexed, folded, or pleated without breaking or crumbling to the touch.

Example 21

A microporous material was prepared as in Example 20 except ETFE 6235 fluoropolymer was used as the nucleating agent. The resulting microporous material had the following properties: an average film thickness of 23 μm; a bubble point pore size of 0.280 μm; a porosity of 51.2%; and a resistance to water flow of 178 sec/100 cc. The material was very strong and capable of being flexed, folded, or pleated without breaking or crumbling to the touch.

Example 22

A microporous material was prepared as in Example 20 except Halar 300 DA was used as the ECTFE copolymer and ETFE Tefzel 200 fluoropolymer was used as the nucleating agent. The resulting microporous material had the following properties: an average film thickness of 25 μm; a bubble point pore size of 0.70 μm; a porosity of 63.0%; and a resistance to water flow of 54 sec/100 cc. The material was very strong and capable of being flexed, folded, or pleated without breaking or crumbling to the touch.

Example 23

A continuous roll of microporous ECTFE material was prepared using a 40 mm twin screw extruder equipped with a hopper, eight zones with independent temperature controls and a liquid reservoir for supplying diluent to the extruder. Halar 902 ECTFE copolymer pellets and ETFE 6235 nucleating agent were introduced into the hopper using a solids feeder and the materials were fed into the extruder which was maintained at a screw speed of 150 rpm. DBS diluent was fed separately from the reservoir into extruder. The weight ratio of ECTFE copolymer/diluent/nucleating agent was 59.5/40.0/0.5. The total extrusion rate was 9.07 kg/hr and the extruder's eight zones were set to provide a temperature profile for zones 1 to 8 of 200° C., 254° C., 260° C., 243° C., 227° C., 227° C., 227° C., and 227° C. The melt composition was uniformly mixed and subsequently pumped through a double-chromed coat-hanger slot film die maintained at 227° C., and cast onto patterned casting wheel maintained at a wheel temperature of 66° C. with a gap between the film die and the casting wheel of 2.5 cm. The casting speed was 2.14 m/min and the film was washed in-line in a continuous manner to remove the DBS in Vertrel 423, air dried, and sequentially oriented in the length and cross direction at 1.7×2.0 at a temperature of 137° C.

Figure 4:
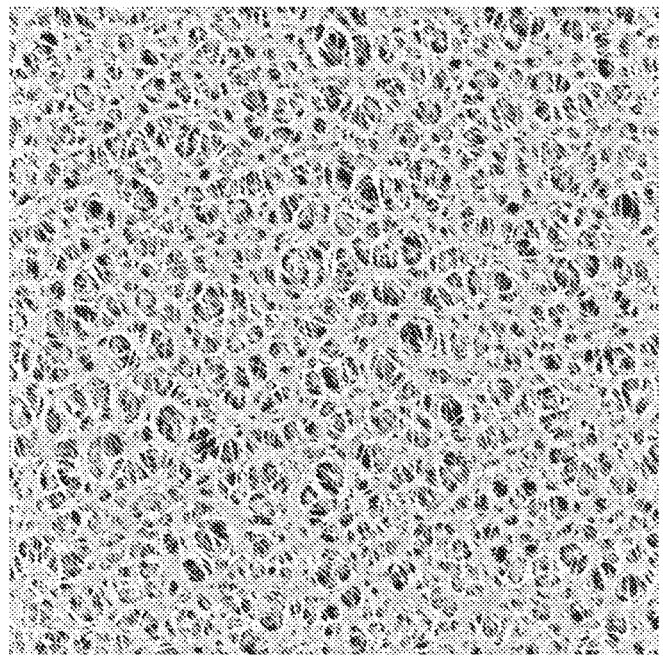
FIG. 4 is a photomicrograph of a surface of microporous ECTFE material prepared according to Example 21 herein.

The continuous roll of nucleated microporous ECTFE material was very strong. As shown in the photomicrograph of FIG. 4, the material was free of any surface skins, and it was capable of being flexed, folded, or pleated without breaking or crumbling to the touch. The material had an average film thickness of 53 μm; a bubble point pore size of 0.20 μm; a porosity of 56.2%; and a resistance to water flow of 323 sec/100 cc.

Example 24

Microporous ECTFE flat sheet material was prepared using an extrusion process similar to Example 23 except that (1) the ECTFE/DBS/ETFE weight ratio was 56.2/43.3/0.5; (2) the total extrusion rate was 13.6 kg/hr; (3) the extruder screw speed was 230 rpm; and (4) the casting speed was 3.58 m/min. The film was washed in-line in a continuous manner to remove the DBS in Vertrel 423, air dried, and four samples (A-D) of the microporous ECTFE material were sequentially oriented in a length orienter machine to a stretch ratio of 1.5:1, and also stretched in the cross-direction in a tenter oven equipped with eight temperature zones to a stretch ratio of 2.45:1. In all cases, the length direction stretch was made at 121° C. For each sample A-D in the tenter oven, the temperatures in one or more of the zones were varied from sample to sample, as indicated in Table 3. Following exposure to the tenter oven, the resulting materials were subject to testing. Results of the testing indicated that each of the samples had pore properties influenced by the stretch temperatures.

TABLE 3

| Example 22 | Tenter Oven Zone | Tenter Oven Temp by zone (° C.) | Membrane Thickness (um) | Pore Size (um) | Porosity (%) | Water Flow Resistance (seconds/100 cc) |
|---|---|---|---|---|---|---|
| A | 1 | 121 | 40.6 | 0.237 | 65.0 | 200 |
|   | 2 | 121 |  |  |  |  |
|   | 3 | 132 |  |  |  |  |
|   | 4 | 132 |  |  |  |  |
|   | 5 | 149 |  |  |  |  |
|   | 6 | 149 |  |  |  |  |
|   | 7 | 149 |  |  |  |  |
|   | 8 | 143 |  |  |  |  |
| B | 1 | 121 | 43.2 | 0.265 | 66.5 | 186 |
|   | 2 | 121 |  |  |  |  |
|   | 3 | 132 |  |  |  |  |
|   | 4 | 132 |  |  |  |  |
|   | 5 | 149 |  |  |  |  |
|   | 6 | 149 |  |  |  |  |
|   | 7 | 154 |  |  |  |  |
|   | 8 | 154 |  |  |  |  |
| C | 1 | 121 | 45.7 | 0.310 | 67.5 | 100 |
|   | 2 | 121 |  |  |  |  |
|   | 3 | 132 |  |  |  |  |

TABLE 3-continued

| Example 22 | Tenter Oven Zone | Tenter Oven Temp by zone (° C.) | Membrane Thickness (um) | Pore Size (um) | Porosity (%) | Water Flow Resistance (seconds/100 cc) |
|---|---|---|---|---|---|---|
| | 4 | 143 | | | | |
| | 5 | 149 | | | | |
| | 6 | 149 | | | | |
| | 7 | 154 | | | | |
| | 8 | 154 | | | | |
| D | 1 | 121 | 47.0 | 0.321 | 68.5 | 86 |
| | 2 | 121 | | | | |
| | 3 | 132 | | | | |
| | 4 | 154 | | | | |
| | 5 | 160 | | | | |
| | 6 | 160 | | | | |
| | 7 | 160 | | | | |
| | 8 | 154 | | | | |

Comparative Example E

Figure 3:
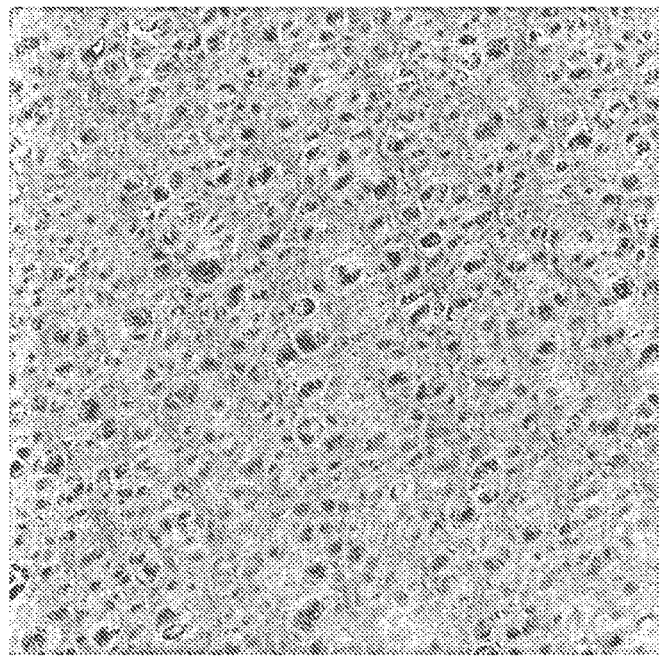
FIG. 3 is a photomicrograph of a surface of microporous ECTFE material prepared according to Comparative Example E herein.

A continuous roll of microporous ECTFE material was prepared in a similar manner as in Example 21 but with no nucleating agent. In order to obtain a non-nucleated film with enough strength to be stretched, the diluent was reduced to 40 wt %, and the casting wheel was maintained at 77° C. The cast film was washed and stretched 2.0×2.9. As shown in photomicrograph of FIG. 3, the non-nucleated film had tight surface pores. The material had the following properties: an average film thickness of 37 µm; a bubble point pore size of 0.30 µm; a porosity of 61.1%; and a resistance to water flow of 1350 sec/100 cc.

It was noted that, although the material of Comparative Example E was relatively thin, it had a larger bubble point pore size, and more porosity than the nucleated membrane of Example 23, and it took more than 1000 seconds longer to pass 100 cc of water through its pores because of the tight surface pores.

Although specific embodiments of the invention have been described in detail, variations to the described embodiments may be achieved by one of ordinary skill in the art. Moreover, such variations may be obtainable without departing from the true spirit and scope of the invention, as set forth in the appended claims.

What is claimed is:

1. A microporous material, comprising:
   a first layer comprised of a first layer spherulitic matrix comprising a plurality of individual polymer domains of a first layer ethylene chlorotrifluoroethylene copolymer connected to one another by radiating fibrils and a plurality of first layer pores extending through the first layer spherulitic matrix and having an average pore size greater than about 0.01 micrometer;
   a first layer polymer crystallization nucleating agent uniformly dispersed within the first layer ethylene chlorotrifluoroethylene copolymer in an amount between 0.05 wt % and 1.0 wt %;
   a second layer comprised of a second layer spherulitic matrix comprising a plurality of individual polymer domains of a second layer ethylene chlorotrifluoroethylene copolymer connected to one another by radiating fibrils and a plurality of second layer pores extending through the second layer spherulitic matrix and having an average pore size greater than about 0.01 micrometer;
   a second layer polymer crystallization nucleating agent uniformly dispersed within the second layer ethylene chlorotrifluoroethylene copolymer; and
   wherein, the average pore size of the first layer spherulitic matrix and the average pore size of the second layer spherulitic matrix are different.

2. The microporous material according to claim 1 wherein the microporous material is strong enough to withstand being flexed, folded, or pleated without breaking.

3. The microporous material according to claim 1 further comprising a third layer affixed to the second layer, the third layer comprised of a third layer spherulitic matrix comprising a plurality of individual polymer domains of a third layer ethylene chlorotrifluoroethylene copolymer connected to one another by radiating fibrils and a plurality of third layer pores having an average pore size greater than about 0.01 micrometer and extending through the third layer spherulitic matrix; and
   a third layer polymer crystallization nucleating agent uniformly dispersed within the third layer ethylene chlorotrifluoroethylene copolymer.

4. The microporous material according to claim 3 further comprising a fourth layer affixed to the third layer, the fourth layer comprised of a fourth layer spherulitic matrix comprising a plurality of individual polymer domains of a fourth layer ethylene chlorotrifluoroethylene copolymer connected to one another by radiating fibrils and a plurality of fourth layer pores having an average pore size greater than about 0.01 micrometer and extending through the fourth layer spherulitic matrix; and
   a fourth layer polymer crystallization nucleating agent uniformly dispersed within the fourth layer ethylene chlorotrifluoroethylene copolymer.

5. The microporous material according to claim 1 wherein the polymer crystallization nucleating agent is a fluoropolymer having a crystallization temperature higher than the crystallization temperature of the ethylene chlorotrifluoroethylene copolymer.

6. The microporous material according to claim 1 wherein the polymer crystallization nucleating agent is a copolymer of tetrafluoroethylene and ethylene (ETFE), a copolymer of tetrafluoroethylene, hexafluoropropylene and vinylidene fluoride (THV), a copolymer of tetrafluoroethylene and hexafluoropropylene (FEP), or combinations thereof.

7. The microporous material according to claim 1 wherein the polymer crystallization nucleating agent is a particulate dispersed in a thermoplastic polymer.

8. The microporous material according to claim 7 wherein the thermoplastic polymer comprises a polypropylene homopolymer, a polyethylene homopolymer, or a polypropylene polyethylene copolymer.

9. The microporous material according to claim 1 wherein the first layer is a stretched layer comprising a stretch ratio ranging from 1×1 (machine direction×transverse direction) to 3×3.

10. The microporous material according to claim 1 wherein the first layer is a stretched layer comprising an elongation of 10% to 300% in the machine direction, the transverse direction, or both.

* * * * *